Jan. 27, 1970 L. H. BAKER, JR 3,492,564

METAL BODY LOCATOR INCLUDING TWO SIMILAR, FUNCTIONALLY VARIABLE FREQUENCY OSCILLATORS TWO SEARCH COILS AND CROSS-COUPLING MEANS

Filed Jan. 22, 1968 3 Sheets-Sheet 1

INVENTOR.
Leslie H. Baker, Jr.

BY Munson H. Lane

ATTORNEY

INVENTOR.
Leslie H. Baker, Jr.
BY
Munson H. Lane
ATTORNEY

Jan. 27, 1970 L. H. BAKER, JR 3,492,564

METAL BODY LOCATOR INCLUDING TWO SIMILAR, FUNCTIONALLY VARIABLE FREQUENCY OSCILLATORS TWO SEARCH COILS AND CROSS-COUPLING MEANS

Filed Jan. 22, 1968 3 Sheets-Sheet 3

INVENTOR
Leslie H. Baker, Jr.

BY Munson H. Lane
ATTORNEY

United States Patent Office 3,492,564
Patented Jan. 27, 1970

3,492,564

METAL BODY LOCATOR INCLUDING TWO SIMILAR, FUNCTIONALLY VARIABLE FREQUENCY OSCILLATORS, TWO SEARCH COILS AND CROSS-COUPLING MEANS

Leslie H. Baker, Jr., 1417 Lincoln Ave., Fort Worth, Tex. 76106

Filed Jan. 22, 1968, Ser. No. 700,678
Int. Cl. G01v 3/10
U.S. Cl. 324—3 18 Claims

ABSTRACT OF THE DISCLOSURE

An electronic metal body locator for locating metal bodies comprising a pair of similar oscillators tuned to oscillate at slightly different frequencies, and produce first and second high frequency signals, a first inductive search coil coupled with one of said oscillators, and a second inductive search coil coupled with the other of said oscillators, said search coils operating in response to the presence of a metal body within the sensitivity range of the electromagnetic field of said search coils to shift the frequency of their respective oscillators, a detector responsive to the first and second high frequency signals produced by said oscillators for producing an audible beat frequency signal, and controlled cross-coupling means between the pair of oscillators for pulling said oscillators toward, but short of, a common intermediate frequency.

This invention relates to an improved beat frequency metal locator for locating metal by detection of the change in frequency of a radio frequency oscillator when a search coil providing the inductance of an oscillator tuned circuit is brought near to the metal.

This invention relates particularly to an improved metal locator of a portable type which is useful for locating metallic materials which may be buried in the ground, pavements or other hidden places. However, the usefulness of the invention is not limited to a locator of a portable construction, as it is contemplated that the invention could be used in a stationary metal locator system where the materials to be detected pass in proximity to the locator.

It is an object of this invention to provide a beat frequency metal locator with two search coils of different sizes which are available for use at all times.

It is a further object of this invention to provide a beat frequency metal locator which includes a pair of similar oscillators one of which has a search coil of larger size than the search coil of the other, and whose controlled pulling effect provides improved range sensitivity.

It is still a further object of this invention to provide a beat frequency metal locator with a cross-coupling link between two oscillators which permits the adjustment of cross-coupling, and thereby offers simultaneous adjustment of the locator sensitivity and the desired beat frequency.

It is further an object of this invention to provide a beat frequency metal locator having a pair of search coils of different diameter in separate oscillator circuits, which coils are mounted at opposite ends of an angular handle bar. When so mounted one search coil may be held in an active position for sensing a metal object buried in the earth while the other search coil is held in an inactive position where it is insensitive to the buried object, and the coils may be reversed by the operator merely by rotating the handle.

It is further an object of this invention to provide a gravity actuated phase shift tuner as an electromagnetic load to one of the oscillators of the beat frequency metal locator whose search coils are mounted at opposite ends of an angular handle bar such that the direction of beat frequency shift is preserved as originally selected regardless of which of its search coils is in the active search position. The phase shift turner may employ several shorted turns of wire as the gravity positioned element or it may employ a small piece of ferritic material for an effect of opposite sense to that obtained with the shorted turns of wire. The phase shift tuner may be pivotally mounted on one of the search coils so that when the search coil is positioned parallel to the earth's surface the phase shift turner moves toward the search coil and when the coil is moved to a position approximately perpendicular to the earth's surface the phase shift tuner moves away from the search coil.

It is a further object of this invention to provide an improved beat frequency metal locator having a pair of transistor oscillators whose oscillator bias is adjusted for minimum base current for purposes of thermal stability, and whose oscillator gain may be controlled slightly above and below unity by means of a regeneration control potentiometer.

It is further an object of this invention to provide a portable beat frequency metal locator having a pair of search coils of different diameter which are mounted on the same end of a handle with the smaller diameter coil positioned within the larger diameter coil.

When the term "metal" is used in this application it is used in the broad sense and include ferromagnetic materials and non-ferromagnetic materials.

Other features and advantages of the invention will become apparent from the following description taken in conjunction with the drawings wherein like reference numerals refer to like elements and in which:

FIG. 1 is a schematic diagram of the electrical circuit of one form of this invention.

FIG. 2*a* is a perspective view showing one form of the invention which includes a pair of search coils mounted on opposite ends of a bent handle bar with one search coil in active position and the other search coil in inactive position.

FIG. 2*b* is a perspective view similar to FIG. 2*a* but showing the handle and search coils in reversed position.

FIG. 3*a* is a graphical presentation of the reference frequency F and active oscillator frequency $f_1$ of a conventional single search coil beat frequency metal locator, showing the amplitude of frequency shift of the active oscillator only when a metal object is detected.

FIG. 3*b* is a like graphical presentation of the reference frequency F and active oscillator frequency $f$ for the two search coil beat frequency metal locators of this invention showing the amplitude of frequency shift for both the reference oscillator frequency and the active oscillator frequency when a metal object is detected.

FIG. 4*a* is an enlarged vertical sectional view taken on line 4*a*—4*a* of FIG. 2*b* showing a portion of one of the search coil assemblies of this invention with a phase shift tuner mounted thereon.

FIG. 4*b* is a side elevational view of the phase shift tuner shown in FIG. 4*a* after the support bar for the phase shift tuner has been raised to the vertical position.

As is commonly known, a beat frequency metal locator utilizes two sources of radio frequency energy. One of these oscillating sources is tuned to a selected radio frequency, $f$ which is usually in the range between 200 kilohertz and 2000 kilohertz. The second oscillating source is tuned to a selected radio frequency, F, which is slightly higher in frequency.

These two frequencies, $f$ and F, are introduced into a detector circuit which may be one of various known types. It may be a simple diode rectifying signals to a high impedance headset, or it may be any commercial radio receiver which will tune to frequencies $f$ and F. The function of the detector is to generate a new frequency which is the algebraic difference between its input signals, $f$ and F. This difference frequency is defined as the beat frequency, BF. Thus, expressed algebraically, $$BF=F-f \quad \text{(Equation 1)}$$

It is apparent from the above equation that if frequency F is held constant and if frequency $f$ is varied by the proximity of a metal object to the coil of its oscillator, then the beat frequency, BF, will likewise vary. This variation in beat frequency is in the audio range of the human ear. Each time the operator hears a change in the beat frequency, he realizes that the active search coil of his metal locator has been brought near to a metallic object.

The pitch of the audio beat frequency heard by the operator will decrease to non-ferromagnetic metallic objects and increase to ferromagnetic objects if the active search coil oscillator is tuned slightly lower in frequency than the reference oscillator.

PHYSICAL STRUCTURE

Figures 2A, 2B:
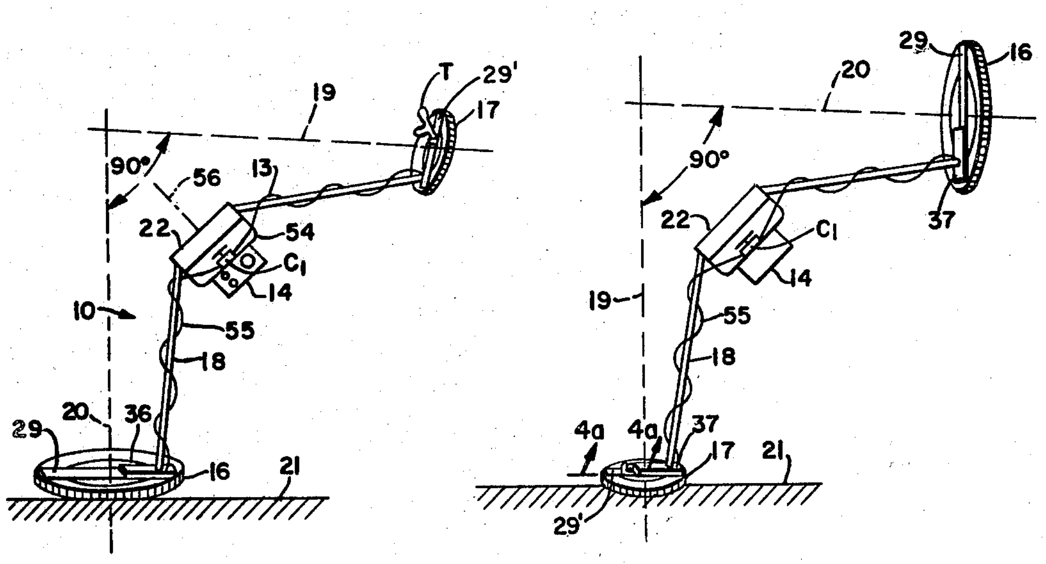

Referring to FIGURE 2*a*, the physical structure of one form of beat frequency metal locator 10 of this invention is shown in perspective view as it would normally be held by an operator (not shown) searching for metal objects hidden in the earth 21. The metal locator 10 includes an angular handle bar 18 supporting separate search coil assemblies 16 and 17 of different diameter at opposite ends of the handle bar. The search coil assemblies 16 and 17 as shown are flat annular coil packages mounted on support bars 29, 29' respectively, which extend diagonally across the surface of the annular coil packages. The support bars 29, 29' are secured beneath housings 36, 37 respectively in which are compartments containing various components of oscillators X and Y with which the search coils 16 and 17 are linked. Sockets extending into each of the housings 16 and 17 from the outer surface thereof provide connections wherein the opposite ends of the carrying stick 18 are secured by suitable coupling means such as screw threads, adhesives or the like. An operator's handle 22 at the bend of the handle bar 18 supports a U-shaped frame 54 to which is attached a beat frequency detector 14, and a cross coupling tuning capacitor $C_1$ which will subsequently be described.

The beat frequency detector 14 is shown to be an AM transistor radio with a self-contained antenna (see FIG. 1), but it may be a simple diode detector or other known type radio frequency detector. The detector 14 is responsive to the electromagnetic radiation fields of the oscillators X and Y but is not otherwise electrically connected to the oscillators. The cross coupling tuning capacitor $C_1$ is connected in electrical circuit 13 with cross coupling inductances $L_1$ and $L_2$ (see FIG. 1) forming elements of the search coil assemblies 16 and 17 respectively by means of flexible wiring 55.

The housings 36 and 37 are preferably made of lightweight wood since the use of wood reduces to a small degree the adverse effects of having a metallic material in the immediate field of the search coils 16 and 17 respectively. However, the housings 36 and 37 may be made of metal or plastics without having any serious adverse effect on the effectiveness of this invention.

FIGURE 2*b* differs from FIGURE 2*a* in that it shows the metal locator 10 rotated 180 degrees about an axis 56 which is perpendicular to the longitudinal axis of the generally cylindrical handle 22 so that the positions of the search coil assemblies 16 and 17 are reversed. The large diameter search coil assembly 16 is held just above and approximately parallel to the ground in FIGURE 2*a* while the small diameter search coil assembly 17 is held just above and approximately parallel to the ground in FIGURE 2*b*. The angle of bend of the handle bar 18 and the angle of attachment of the search coil assemblies 16 and 17 to the handle bar are such that when the axis 20 of the search coil 16 and its electromagnetic field is perpendicular to the ground, the axis 19 of the search coil 17 and its electromagnetic field is approximately parallel to the ground and thus intersects the axis 20 at approximately 90 degrees. The length of the handle bar is such that when one of the search coils is held just above and parallel to the ground, the other search coil is approximately three and one-half feet above the earth. Because of the angular arrangement of the search coils 16 and 17 as has been described, the search coil which is held parallel to the ground is active and is sensitive to metal objects over which it may pass, while the other search coil whose electromagnetic field axis is 90 degrees displaced from the axis of the active search search coil, is passive nd insensitive to frequency disturbance by the metal objects.

ELECTRICAL SYSTEM

Figure 1:
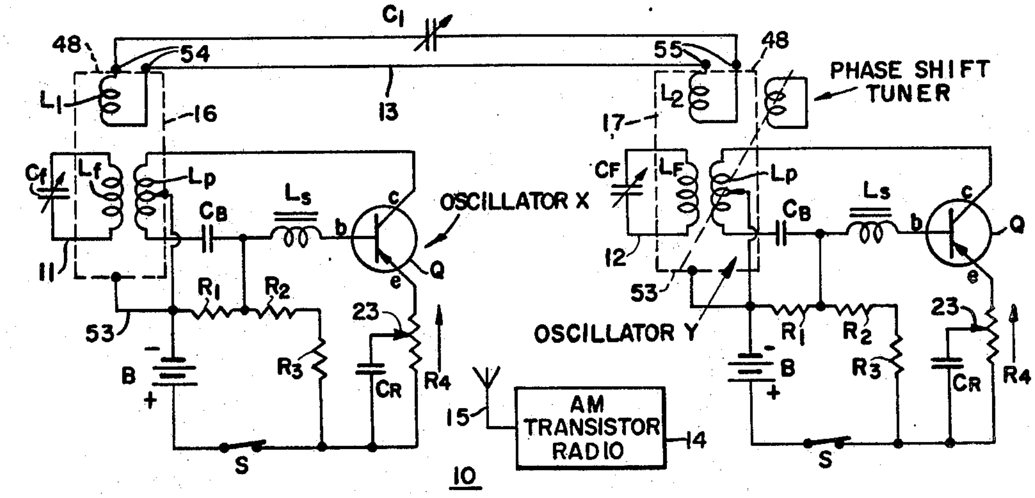

As shown by way of schematic diagram in FIGURE 1, the beat frequency metal locator 10 of this invention includes two electronically identical oscillators, X and Y both of which are equipped with search coils $L_f$ and $L_F$ respectively in their tuned circuits. The two oscillators X and Y each with its separate search coil are used to improve makedly the performance of the beat frequency metal locator of this invention over other known types of beat frequency metal locators. The specific design of the tuned circuit of the oscillators X and Y is not of critical significance to the property of "pulling" later to be described as an important feature of this application. However, in FIGURE 1 the tuned oscillatory circuits are shown as isolated loosely coupled tank circuits 11 and 12 including a variable tuning capacitor and inductor $C_fL_f$ and $C_FL_F$ respectively. The provision of such isolated loosely coupled tank circuits in beat frequency metal locators is believed to be novel to this invention, the beneficial results of which will be subsequently pointed out. The tank circuits 11 and 12 are shown coupled to the remaining portions of the oscillators X and Y respectively through center-tapped driver coils $L_p$.

Since each of the oscillators X and Y are electronically identical, like parts are identified by like reference designations. Each oscillator as shown includes a single PNP transistor Q having an emitter *e*, a base *b*, and a collector *c*. The collector to base circuit *cb* includes the center-tapped driver coil $L_p$, a base capacitor $C_B$ and an inductance $L_S$ connected in series circuit from the collector to the base. The center-tap of the driver coil $L_p$ is connected to the negative terminal of a battery power source B whose positive terminal is connected through a switch S and a regeneration control potentiometer $R_4$ to the emitter *e*. A capacitor $C_R$ connected between the variable arm 23 of the potentiometer $R_4$ and the B+ side of $R_4$ provides an RF bypass for the regeneration control potentiometer. A voltage divider network comprising resistors $R_1$, $R_2$ and $R_3$ connected in series to opposite terminals of the battery B provides base bias for the transistors Q which is taken from the junction of $R_1$ and $R_2$ and is applied to the junction of $C_B$ and $L_S$ in the base-collector circuit. The operation and requirements for oscillators X and Y will be described in more detail later in this description.

The switches in each oscillator may be omitted, and its function for making and breaking the power circuit provided for by the provision of readily accessible and detachable connections to the battery B. For the latter purpose, the battery B for each oscillator may be detachably mounted on top of the oscillator housings 36 and 37 by means of spring clips which are wired into the oscillator circuits. The removal of battery B serves the same function as opening switch *s*.

SEARCH COIL ASSEMBLIES

Associated with oscillator X is a search coil assembly 16 comprising inductances $L_f$, $L_p$ and $L_1$ all wound in annular flat coils within a common package 42, and associated with oscillator Y is a search coil assembly 17 comprising inductances $L_F$, $L_P$ and $L_2$ all wound in annular flat coils in a similar common package 42. Because the diameter of the search coil determines the limit range sensitivity and the minimum size of the object which can be detected, one oscillator will be made with a search coil diameter considerably greater than the search coil diameter of the other. The outside diameter of the search coil assembly 16 for example could be made twelve inches, and the outside diameter of the search coil assembly 17 could be made six inches. Other dimensions could be chosen depending on the maker's preference.

Figures 4A, 5, 6, 7:
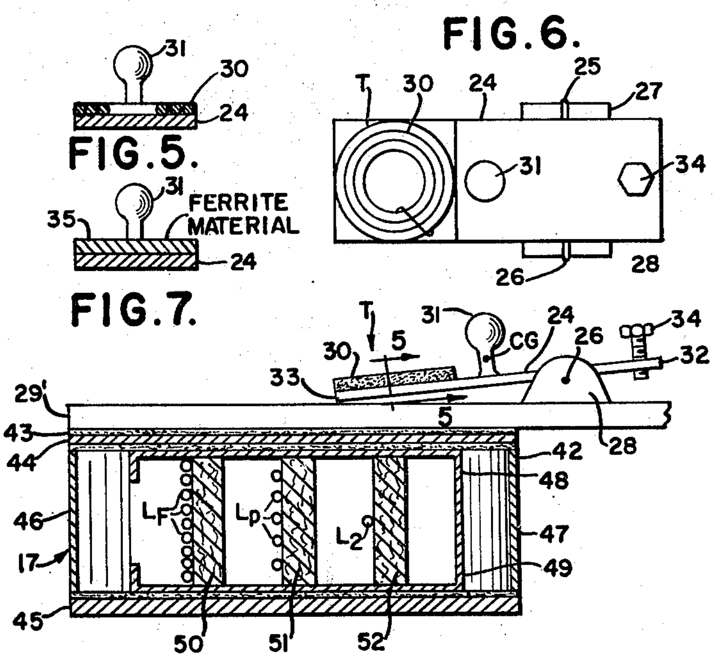
FIG. 5 is a vertical cross sectional view through the phase shift tuner taken on line 5—5 of FIG. 4*a*.
FIG. 6 is a top plane view looking down on the phase shift uner shown in FIG. 4*a*.
FIG. 7 is a sectional view similar to FIG. 5 through another form of phase shift tuner used with this invention.

A sectional view of the search coil assembly 17 taken on line *4a*—*4a* of FIGURE 2*b* is shown in FIGURE 4*a* where the parts are blown up for clarity and are not necessarily in correct proportion. The search coil assembly 17 comprises an annular enclosed package 42 attached to the support bar 29' by adhesive 43 or other suitable attaching means. The annular package 42 is preferably made of cardboard and includes an annular top cover 44, an annular bottom cover 45 and radially spaced outer and inner vertically corrugated cardboard walls 46 and 47 respectively which are adhesively secured to the top and bottom covers 44 and 45 near their inner and outer edges. Adhesively secured to the inside walls of the housing 42 is an aluminum foil liner 48 which serves as a shield. Radially spaced annular cardboard forms 50, 51 and 52 are secured within the enclosed package 42. The windings of the oscillator tank circuit inductance $L_F$ are wound on form 50, the windings of the center tapped inductance $L_p$ are wound on form 51 and the single turn winding of the cross link inductance $L_2$ is wound on form 52.

The physical construction of the search coil assembly 16 is similar to the construction of the search coil assembly 17, except that its diameter is greater and the number of turns of wire in the tuned circuit inductance $L_f$ is less. The center-taped coil $L_p$ for both search coils 16 and 17 is typically six turns of AWG 34 magnet wire regardless of the number of turns in the tuned circuit inductance. The number of turns for the tuned circuit inductors $L_f$ and $L_F$ is determined by the diameter of the loop, the range of the tuning capacitors $C_f$ and $C_F$ respectively, and the frequency spectrum which the tuned circuit is to cover.

For example, the search coil assembly 16 is typically:

| | |
|---|---|
| Diameter | 12 inches. |
| Coupling inductance, $L_1$ | 1 turn of AWG 34 magnet wire. |
| Tuned circuit inductance, $L_f$ | 22 turns of AWG 34 magnet wire. |
| R-F primary inductance, $L_p$ | 6 turns of AWG 34 magnet wire, center tapped. |

The coupling inductance $L_2$ in search coil assembly 17, and the corresponding coupling inductance $L_1$ in search coil assembly 16 may be enclosed in their respective search coil packages 42 or they may be alternatively wrapped around the outside of the package. Typically $L_1$ and $L_2$ comprise a single turn of wire. The use of the cross coupling circuit 13 may be optional under conditions as will be subsequently described; therefore $L_1$ and $L_2$ are shown in FIGURE 1 as being detachably connected from the circuit 13 by means of disconnects 54 and 55 respectively. The single turn of wire constituting $L_1$ and $L_2$ has no measurable effect on the operation of the search coil assemblies 16 and 17 if the remainder of the coupling link is disconnected.

The aluminum foil liner 48 within the search coil package 42 serves as a Faraday shield and is indicated by dotted lines 48 in FIGURE 1. The shield will normally be connected to the negative side of the battery B in the oscillator circuits by means of a conductor 53. The Faraday shield is required where the distributed capacitance of the search coil is low, such requirement decreasing as the distributed capacitance approaches or exceeds all other capacitance in the tuned circuit $C_fL_f$ or $C_FL_F$ regardless of the specific electronic design of the tuned circuit.

The thickness of the search coils 16 and 17 (the axial length of the coils) is held as small as possible in order that all turns may be as close to the ground as possible; this is limited, of course, by the need for physical strength of the donut shaped cardboard packaging 42, and also by the need to avoid too close a spacing of the wires for the purpose of holding the inter-turn capacitance of the wires to an absolute minimum.

From the practical standpoint, I have found the optimum to be a donut package whose thickness is ½" to ⅝" and whose turns are as loosely spaced as will give no more than 7 turns per layer of windings. Again for practical purposes only (not electronic critically), I try to make all layers have about the same number of turns for both $L_f$ and $L_p$ with cardboard separators between layers about 1/16" thick.

In the example of FIGURE 2*a*, oscillator X and search coil assembly 16 constitute the active search coil, while oscillator Y and search coil assembly 17 act as the passive, or reference frequency source. However, the previous functions can be easily reversed by simply rotating the entire assembly through 180° to the position shown in FIGURE 2*b*. In the latter position, the search coil assembly 17 becomes the active search coil while oscillator X and the search coil assembly 16 assumes the passive, or reference function. Thus it is seen that the operator may select between two search coil sizes simply by reversing the position of the search coil assemblies 16 and 17.

PHASE SHIFT TUNER

Momentarily disregarding the function of phase shift tuner T with oscillator X tuned slightly higher in frequency than oscillator Y and with oscillator X in the active position (FIGURE 2*a*), a metal object is sensed by an increase in the pitch of the beat frequency. However, with the search coil assemblies in the opposite position so that oscillator Y is the active oscillator, a metal object would be sensed by a decrease in the pitch of the beat frequency.

To eliminate this ambiguity in the phase sense of the beat frequency, FIGURES 1, 2*a*, 2*b*, 4*a*, 4*b*, 5, 6 and 7 show a small accessory called a phase shift tuner T. This small unit is needed on only one of the oscillators and is placed on the smaller search coil assembly 17, because its effect is slightly greater. It could be placed on the search coil assembly 16 nearly as effectively except that the sense of phase change would be reversed.

Figure 4B:
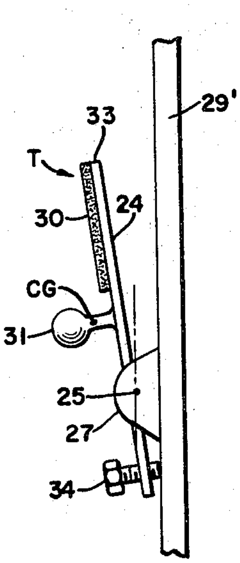

As shown most clearly in FIGURES 4*a*, 4*b*, 5 and 6 the phase shift tuner T is simply a cantilever beam 24 having pivot stubs 25, 26 projecting from opposite sides of the beam, the pivot stubs being mounted in pivot blocks 27, 28 respectively, supported on the upper surface of the support bar 29' of the search coil assembly 17. At one end 33 of the beam 24 are a few turns (usually three to five) of magnet wire 30 with ends shorted (see FIGURES 5 and 6). A weight 31 is attached to the upper surface of the beam 24 near the center thereof, and pivots 25 and 26 are located near the end 32 opposite end 33, so that the center of gravity CG of the beam 24 and appendages lies between the pivots 25, 26 and the end 33 and above a plane through the pivots 25 and 26 which is parallel to the upper surface of the support bar 29'. It will be apparent that with the CG of beam 24 so located, the end 33 will move toward the surface of the search coil assembly 17 when the search coil assembly is parallel to the earth's surface as shown in FIGURE 4*a*. As shown in FIGURE 4*b* the end 33 will move away from the surface of the search coil assembly 17 when the search coil assembly is raised into a nearly vertical position where the center of gravity CG of the beam is above and to the left of the pivot points 25 and 26. A set screw 34 is mounted in the end 32 of beam 24 to adjustably limit the distance which the phase shift tuner coils 30 can move away from the surface of the search coil assembly 17.

When the search coil assembly 17 is in the inactive or reference position as shown in FIGURES 2*a* and 4*b* the shorted turns 30 move away from the search coil assembly 17 and thus have reduced effect in raising the basic frequency of oscillator Y. However, when the search coil assembly 17 is turned to the active position, gravity pulls the shorted turns 30 against the surface of the search coil assembly 17 and increases the frequency of oscillator Y. By careful adjustment of the set screw 34 on the phase shift tuner T and the basic frequencies of oscillators X and Y, the operating frequency of oscillator Y, originally tuned below oscillator X, may be shifted to a new frequency which is above oscillator X when the positions of the search coil assemblies 16 and 17 are physically reversed. Conversely, the same shift occurs in the opposite direction when the search coil assembly positions are reversed again.

A comparable, but oppositely sensed effect is obtained if the shorted turns 30 of the phase shift tuner T are replaced with a small piece of ferritic material 35 (see FIGURE 7). The function of the phase shift tuner T is to preserve the sense of detection to metal objects regardless of which search coil 16 or 17 is being used in the active search position.

Another new and important feature of the metal locator described herein is the provision of the cross-coupling link, $L_1C_1L_2$, as shown schematically in FIGURE 1. The cross-coupling link $L_1C_1L_2$ is optional and may be used either with or without the phase shift tuner, since the two are independent functions. The two inductances, $L_1$ and $L_2$ through tuning condenser $C_1$, makes the search coil 16 a small added load to the search coil 17; likewise, since it is a common impedance, it makes search coil 17 a small added load to search coil 16.

The search coils 16 and 17 are more closely coupled, however, by the cross coupling link 13 than when the cross coupling link is omitted. The value of capacitance $C_1$ of the link determines the amount of cross coupling for any selected frequencies for oscillators X and Y.

SENSITIVITY

The basic sensitivity of any beat frequency detector is determined by how much the beat frequency is shifted by the presence of a given size object at a given range from the active search coil. Obviously, the maximum depth range at which a given object may be detected is the distance where the smallest change in beat frequency may be heard. Because the two coil metal locator described herein approximately doubles the beat shift for a given object at a given range, it is therefore more sensitive than other beat frequency metal detectors which have only a single search coil.

OSCILLATOR PULLING

An important feature of this invention is oscillator pulling which is the effect whereby two oscillators working near the same frequency and with some electromagnetic coupling try to pull one another toward a common intermediate frequency. If the coupling between oscillator X and oscillator Y were excessive, they would pull together to the same frequency and hold at the same frequency; the beat frequency would then be zero and the detector would be quite insensitive. Although this condition must be avoided, the effect of pulling is used to distinct advantage in the two coil metal locator to gain added range sensitivity.

FIGURE 2*a* shows that search coil 16 is very nearly perpendicular to search coil 17. In this geometry there is only a little space coupling between the two coils 16 and 17 and thus only a little pulling effect.

Figure 3A:
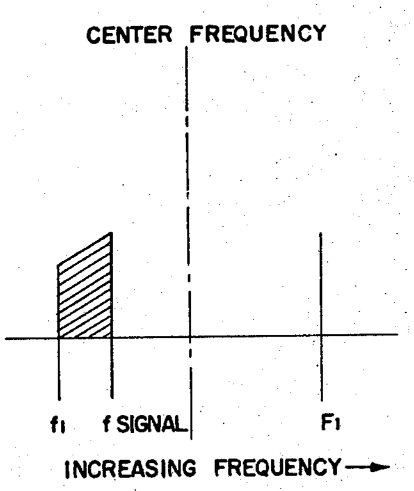
Figure 3B:
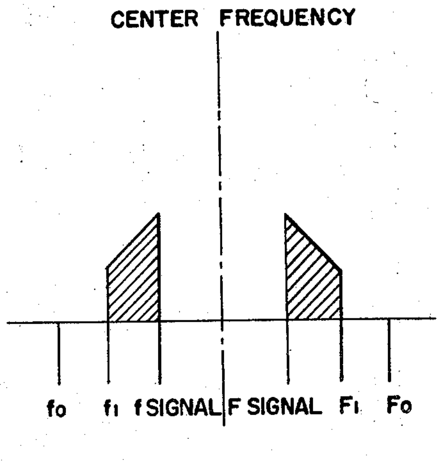

FIGURES 3*a* and 3*b* are used to show how the two coil metal locator is more sensitive than heretofore conventional metal locators made with one search coil.

A conventional single search coil metal locator usually dictates that there be no pulling effect between its search coil (arbitrarily called coil X) and its reference oscillator without a search coil (not shown) operating at a frequency F. With no pulling, the search coil oscillator may be tuned to $f_1$, which is below $F_1$ as shown in FIGURE 3*a*. Under this condition, the reaction of the search coil to the presence of a metallic object would shift the search oscillator frequency to some higher frequency, for example $f_{signal}$. The shift in beat frequency is then given by:

$$\text{BF shift} = (F_1 - f_1) - (F_1 - f_{signal}) = f_{signal} - f_1 \qquad \text{(Equation 2)}$$

The two coil metal locator described herein gives more frequency shift than the conventional single coil metal locator as a result of the beneficial effect of controlled pulling.

Referring to FIGURE 1 schematically, and to FIGURE 3*b* for graphical frequency representation, the two search coil metal locator 10 of this invention is adjusted as follows:

(a) The cross-coupling capacitor, $C_1$ of FIGURE 1 is set to approximately its mid-travel position; thus when the locator 10 is finally tuned, the final beat frequency selected may be shifted in either direction.

(b) Oscillator Y is turned OFF, by opening S and oscillator X is tuned to a frequency $f_0$, an arbitrary value as shown in FIGURE 3*b*.

(c) Oscillator X is now turned OFF, by opening S and oscillator Y is tuned to a frequency $F_0$, an arbitrary value somewhat higher in frequency than $f_0$, as shown in FIGURE 3*b*.

(d) Now both oscillators X and Y are turned ON. Because the two oscillators are coupled, both in the space geometry of the coils as well as by the coupling link $L_1C_1L_2$ each oscillator will try to pull the other toward its own frequency. The result is a new operating frequency for both oscillators X and Y each of which is nearer the center frequency than before. Referring again to FIGURE 3*b*, $f_0$ is pulled to a frequency $f_1$ and $f_0$ is pulled to a frequency $F_1$. Thus the beat frequency BF is a lower value than it would have been if the pulling effect had not been put to use.

(e) Cross coupling capacitor, $C_1$ now gives the operator a control near his hand by which he can select the performance he desires from the locator 10. Turning the capacitor $C_1$ in one direction will LOWER the beat frequency BF, and turning it in the other direction will RAISE the beat frequency. By careful original adjustment of the oscillators X and Y and by proper design selection of the variable capacitor $C_1$ the operator may cross over the "zero beat" frequency so as to reverse the sense of beat frequency shift to non-ferromagnetic metallic objects and ferromagnetic objects.

In the above described conditions, the amount of frequency shift occurring in the change from $f_0$ to $f_1$ will be approximately the same as the frequency change from $F_0$ to $F_1$ when the power output of the two oscillators X and Y is the same. As will be described later, this is the desirable operating condition, and so this approximate equality of frequency shift will exist.

With the conditions of (a) through (e) described above and with both oscillators working at approximately equal power levels, the operator establishes the same object and range geometry leading to the sensitivity determination for a single coil detector as expressed in Equation 2. The change in the effective inductance of search coil 16 brought about by the presence of the detected object is the same as before, that is $f_1$ is shifted to $f_{signal}$.

However, because the frequency of oscillator Y is also variable, and is being determined, in part, by the pulling of oscillator X, then oscillator Y sees the new $f_{signal}$ as considerably closer in frequency. Frequency $f_{signal}$ therefore exerts much more pulling effect upon oscillator Y. The result is that frequency $F_1$ of oscillator Y is pulled to a new and lower frequency, $F_{signal}$.

Referring to FIGURE 3*b*, the total frequency shift for both oscillators is shown in the shaded zones, and the beat frequency shift heard by the operator is expressed as:

$$\text{BF shift} = (F_1 - f_1) - (F_{signal} - f_{signal})$$

$$= (f_{signal} - f_1) - (F_{signal} - F_1)$$

Since both oscillators are operated at about the same power, then $f_{signal} - f_1$ is approximately equal to $$F_{signal} - F_1$$

and:

$$BF \text{ shift} \overset{@}{=} 2(f_{signal} - f_1) \quad \text{(Equation 3)}$$

Thus, comparing Equation 3 with Equation 2 under the same test conditions, it is seen that the two coil metal locator of this invention yields about twice the beat frequency shift compared to the beat frequency shift of a single coil metal locator. The depth range improvement for this condition is between 10 and 15 percent over the depth range of a single coil metal locator.

One further improvement in the two coil beat frequency metal locator is provided in its inherent thermal stability brought about by the oscillator design of FIGURE 1. Both oscillator X and oscillator Y are stabilized in exactly the same way, so the discussion of stabilizing oscillator X will apply to both.

The thermal instability of a transistor oscillator may be described as follows:

Static bias change at the base of the transistor Q in oscillator X (FIGURE 1) occurs because a temperature change of the circuit changes the static base direct current. These transients are amplified by the total effective gain of the circuit acting as an amplifier; proportional changes in the oscillatory frequency accompany these changes, and these are the objectionable changes which reduce the effectiveness of the detector if they are not eliminated. Casual bias of the transistor Q along with external circuit regeneration can easily yield circuit gain of 300 to 400. In such case, the very small frequency shift which would result from a small change in the base direct current becomes a very large frequency shift because this change corresponds to a signal that is amplified by the gain of the stage acting as an amplifier.

However, an amplifier acting as an oscillator is not required to have such high gains if (as in the case of this two search coil metal locator) no appreciable power is to be demanded of the circuit. The total circuit gain need only be slightly greater than unity; with the gain of unity, then a small change occurring in the base circuit is multiplied only by unity in the feedback process. Thus, such small transient is hardly increased at all, hence its effect of causing a shift in the fundamental frequency of the oscillator is negligible.

To eliminate almost all of the thermal drift of oscillator X (and oscillator Y), the oscillator circuit of FIGURE 1 is adjusted as follows to reduce the gain to a value just slightly greater than unity:

(a) With $L_s$ of the circuit temporarily replaced with a direct current microammeter (not shown), the base bias circuit consisting of $R_1$, $R_2$, and $R_3$ is selected for the minimum base current that will permit sustained oscillation when the regeneration control, $R_4$, is set near to its mid-travel position. The direct current in the base circuit under this condition will be some value between 0 and 15 microamperes.

(b) $R_1$ and $R_2$ are first found as empirical values which approximate the correct bias. The final bias is then found by selection of $R_3$, which is varied in step of 1 to 2 percent of the values of $R_1$ or $R_2$ until the best value has been found. (Of course, this correct operating bias could also be found by using a potentiometer in place of $R_1$, $R_2$, and $R_3$, either procedure gives the same result.)

(c) The resistances of step (b) above are wired into the circuit permanently and $L_s$ is again returned to the circuit in place of the microammeter.

(d) The adjustments made in steps (a) through (c) provide the correct configuration for both oscillator circuits. From this point, clockwise rotation of the regeneration control potentiometer, $R_4$, increases the gain of the circuit, and reduces the thermal stability of the oscillator. Counterclockwise rotation of regeneration control, $R_4$, decreases circuit gain, and increases the thermal stability of the oscillator. $R_4$ of both oscillators X and Y should be set as far in the counterclockwise direction as will allow sustained oscillation in both. $C_R$ provides the RF ground for the regeneration control.

OPERATION

In using the form of the invention shown in FIGS. 2*a* and 2*b* as a portable metal locator the operator grasps the metal locator 10 by the handle 22 and walks along the ground with one of the search coils 16 or 17 held above and parallel to the ground. For rough searching, the large diameter search coil assembly 16 is used as the active search coil which is held parallel to the ground (see FIG. 2*a*) because its inductive field covers a larger area than the inductive field of the smaller diameter search coil 17. The operator hears an audible signal from the detector 14 corresponding to the beat frequency between oscillators X and Y. When the active search coil is moved over a metal object the operating frequency of the oscillator associated with the active search coil will be shifted slightly above or below the normal operating frequency of the oscillator depending on whether the metal object is ferromagnetic or non-ferromagnetic. As previously explained when the operating frequency of one oscillator is shifted the operating frequency of the other oscillator is shifted toward the new operating frequency of the oscillator with the active search coil and the operator becomes aware of the presence of the metal object because of the change of frequency of the audible beat frequency signal. If the metal object is small the operator will hear two peak changes in the audible beat frequency signal as first one side of the search coil and then the opposite side of the search coil passes over the detected object. The operator by rotating the handle 22 180° can then bring the smaller diameter search coil into the active position parallel to the ground and narrow the search field so that the small object can be more easily detected.

If the metal object is large, for example, of a diameter of the size of the large diameter search coil, then only one peak change in beat frequency signal will be heard by the operator as the active search coil moves over the metal object. The operator will know that the detected object is large and can find the object by digging without much difficulty.

Figure 8:
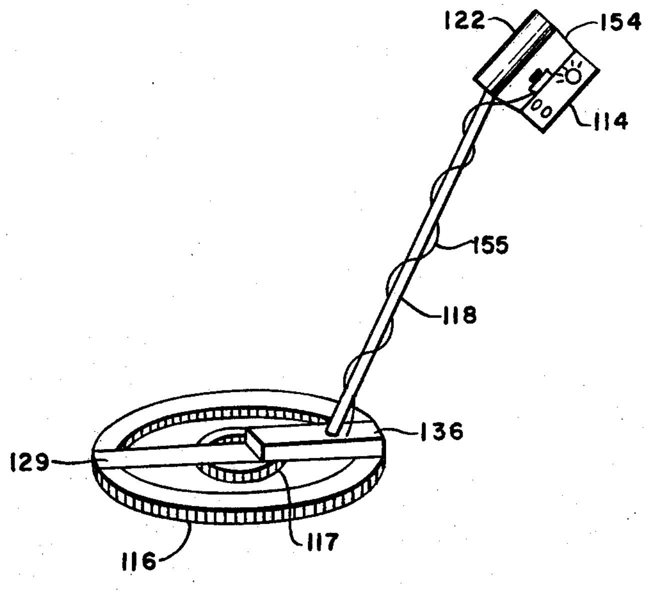
FIG. 8 is a perspective view of a modified form of the invention.

An alternate embodiment of the invention is shown in FIGURE 8, where a metal body locator 110 is shown. The metal body locator 110 includes the same electrical components as the metal body locator 10 with the exception that the phase shift tuner T is not required and is therefore omitted. It differs in physical structure from the metal body locator 10 in that both of the search coils 116 and 117 for oscillators X and Y are mounted at one end of a handle bar 118 beneath a support bar 129. The oscillators X and Y (not shown) are enclosed in the housing 136 to which the handle bar 118 is connected. An AM transistor radio 114 similar to the radio 14 of FIGURE 1 is mounted by means of a U-strap 154 beneath the handle portion 122 of the handle bar. A cross-coupling capacitor $C_1$ is mounted on the inside of the U-strap 154 near the handle portion 122 within convenient reach of the operator and is connected to cross coupling inductors $L_1$ and $L_2$ by means of conductors 155. The search coil 117 is of a diameter which is of a small percentage of the diameter of the search coil 116. Both search coils are in active position hence either could be sensible to the presence of a metal or ferromagnetic object. However, because of the property of range versus coil diameter as discussed previously, the larger diameter search coil 116 would be most affected by larger and deeper objects, while the very much smaller diameter search coil 117 would be affected only by much closer objects either small or large in size.

Having described in general the basic features and operation of the invention, further description of some of the details of the invention follows.

FLOATING TANK CIRCUITS

Referring to FIGURE 1, consider that the two independent coils, $L_f$ and $L_p$ constitute a radio frequency transformer. The secondary of this RF transformer, $L_f$, together with tuning capacitor, $C_f$, constitute the basic tuned circuit of the oscillator. The combination is sometimes referred to as a "floating tank," since the basic oscillatory circuit carries none of the direct current of the transistor circuitry. This tuned circuit is excited by any small transient in the transistor oscillatory network connecting the collector and base. Oscillation is sustained in the tuned circuit because there is no power loss in the metal detection function, therefore, the voltage gain of transformation from $L_p$ to $L_f$ is conserved in addition to the very high resonant rise in voltage in the tuned circuit which results from the very low direct current resistance of the tuned circuit.

Conversely, the reciprocal transformation back to the primary, $L_p$, gives the current gain required for amplification (in this case, sustained oscillation) in the transistor Q. This arrangement works extremely well. So well, in fact, that the loose coupling between the tuned circuit and $L_p$ almost eliminates the effects of capacitive loading anywhere in the circuit except in the tuned circuit itself. For example, a person may actually touch the wiring of the $L_p$ network, the base, or collector of the transistor Q with only a slightly noticeable shift in the output beat frequency of the detector. This cannot be done with other designs of oscillators whose tuned circuit is actually contained in the network between base and collector of the transistor.

It is emphasized that the above desirable features do not in any way establish a dependency for the beneficial effect of employing "PULLING" between two proximate oscillators. The pulling effect would work substantially the same regardless of the specific design of the oscillator or its tuned circuit, whether it be a conventional Hartley, Colpitts or any other type of oscillator circuit.

By stating that the specific design of the oscillator circuit is not critical, I mean that the beneficial property of "PULLING" resulting from this invention is not dependent on one specific oscillator design. Various oscillator designs would perform in the same manner as described herein.

Also, the beneficial effect of thermal stabilization can be obtained in various transistor oscillator designs with the combination of:

(a) Adjustment of the base bias bleeder resistors after selection of the emitter direct current load resistance, $R_4$, so that the direct current in the base circuit is as near absolute zero as will support any oscillation, and (b) Adjustment of the regeneration control potentiometer, $R_4$, so that the total circuit regeneration is just barely enough to support continuous self-oscillation by the oscillator circuit.

What the above statements (a) and (b) amount to are that the frequency change which might result from a change in the ambient and internal temperature of the transistors Q are an absolute minimum. This results because with practically zero base current, there is no heating of the base junction of the transistor Q therefore, no current transient to be amplified. Also, by setting the regeneration control potentiometer $R_4$ for the very least regeneration which will support sustained oscillation, the gain of the oscillator circuit (looked upon as an amplifier) is just barely above unity. Therefore, if there is any thermal transient present at the base *b*, it will not be appreciably amplified by the transistor Q because the gain (or amplification factor) of the circuit is deliberately made unity.

I believe that this is a novel application of base bias and regeneration control. One of the problems which has been experienced with many metal locators prior to this invention is their extreme thermal instability. If a metal locator which is thermally unstable is adjusted to a given beat frequency in the shade and the same locator is moved into the sunlight, the non-signal beat frequency will immediately start to drift quite rapidly. In a few seconds the beat frequency could be several hundred or even more than a thousand cycles away from the starting point. On the other hand if the oscillator circuit has been properly stabilized according to this invention, the frequency of the oscillator will be shifted only a few Hertz as a result of temperature changes such as result from moving the metal locator from the shade to sunlight and vice versa.

This invention is not dependent upon the use of expensive high quality transistors in the oscillator circuit for thermal stability and good performance. In the course of experimenting with various oscillator circuits and components I have found that poor quality transistors (having low beta factors) which were capable of sustaining oscillations worked better than high quality transistors with a large beta factor. The only limit to the use of poor quality (low beta) transistors in the oscillator circuits in that the transistors must continue to oscillate in the desired tuning range and under any signal or no-signal conditions. The oscillator circuits X and Y of this invention are of course not limited to the use of poor quality transistors because with the regeneration control of the oscillator circuits even a good quality (high beta factor) transistor can be stabilized for excellent performance. The economic advantages of being able to use the less expensive low beta transistors in the oscillators of this invention should be apparent.

In summary, the oscillator circuits of this invention are believed to be novel in the following stated properties:

(a) An isolated tuned circuit, loosely coupled into the feedback circuit of the transistor, minimizes the capacitive coupling to earth or other surrounding bodies such as the body of the operator for all circuit components except the coil and capacitor which are the tuned circuit.

(b) The thermal stability which results from adjusting the static base current of the transistor to as near zero as possible (regardless of the design of the tuned circuit).

(c) The thermal stability which results from using the regeneration control, $R_4$, for establishing a circuit gain only slightly greater than unity so that frequency shifting transients caused by heat will not be amplified.

With regard to the above, it will be recognized that the application of regeneration control by $R_4$ has long been used in electronic circuits. Its use, however, was exactly opposite in purpose from the use which I described. It has been used as a regeneration control to make the total circuit gain LESS THAN UNITY so that the circuit becomes a detector (radio receiver) rather than an oscillator in my application. My use of regeneration control is to SUSTAIN oscillation while the older use of regeneration control is to SUPPRESS self-oscillation.

COUPLING WHEN, OPTIONALLY, THE CROSS-COUPLING LINK IS NOT EMPLOYED

First, note with reference to FIGURE 1, that the conversion from radio frequencies typically of 1 megahertz to an audio beat frequency anywhere from 1 to several hundred cycles is accomplished entirely by any conventional AM band transistor radio receiver which is strapped to a bar underneath the handle 22 of the handle bar assembly 18. There is no direct wiring into the radio 14 whatsoever. The radio sees each oscillator X and Y as a separate transmitting station (operating at powers of approximately 100 microwatts power output, hence, well within the FCC limit allowed power). Because the two oscillators X and Y are adjusted to operate at minimum power and are physically about the same distance from the transistor radio 14, the signal strength available to the radio 14 from each oscillator X and Y is always very near to the same value. Therefore, when the two oscillators X and Y are tuned to some frequency where there is no interference from other commercial broadcasting stations, the radio automatic volume control circuitry is operating at its minimum level, and these very weak signals from the two search oscillators X and Y are very much amplified by the radio, the difference (beat) frequency produced by detection and a fine, strong audio signal is heard by the operator.

In FIGURES 2*a* and 2*b* two search coil assemblies 16 and 17 are approximately geometrically at right angles and on-axis of either of the search coil assemblies. Also, the radio is carried at approximately a 45° angle to either search coil. The array is therefore generally symmetrical and also, there is interaction between the radio fields of the two search coil assemblies 16 and 17. It is this interaction between the fields of search coil 16 and search coil 17 that causes the "PULLING." Some of the desired pulling effect results solely from the coupling through space in the approximate 4½ ft. which separates the two coils; it is a function of two parameters, viz. the basic tuning of the two tuned circuits ($L_fC_f$ and $L_FC_F$) and the regeneration level established by the setting of the two potentiometers $R_4$.

Although the $L_1C_1L_2$ coupling link is not essential to the pulling, the cross-coupling between the two oscillators X and Y may be made very much tighter by its addition. When the $L_1C_1L_2$ loop is in use, the amount of pulling obtained is the same as before stated to result from the spacial coupling plus considerably more coupling resulting from the power transfer through the cross-coupling loop. In this latter case, the amount of PULLING is determined by the aforementioned parameters plus that of power transfer through the $L_1C_1L_2$ link. This latter effect is controlled by the capacitor $C_1$ which solely for convenience to the operator is mounted on the cross-bar just above the radio receiver 14.

The operator then can adjust the PULLING in the form of an adjustment of $C_1$ made at the handle; thus he does not have to stoop over or raise the search coil assembly to retune either fundamental frequency of oscillator. Practically, this adjustment is simply that of tuning capacitor $C_1$ for the desired beat frequency; the system sensitivity is, of course, greatest for the lowest beat frequency that it is practical to maintain under no-signal conditions.

FUNCTION OF $L_s$

The use (or omission) of $L_s$ in the oscillator circuits X and Y relates to whether the oscillator is manufactured with a high beta (gain) transistor, or one which has not quite met manufacturer's specifications of beta (and has been rejected therefor).

As explained previously a transistor considered poor for other circuit applications than mine is actually a good transistor as applied in this invention. For the purpose of this invention any transistor which will operate as an oscillator, will perform very well. A transistor commonly called good for use in conventional electronic design is also good in my application. But a transistor commonly called poor (and devalued or rejected by the manufacturer) because of its having a low beta is best in my application because its parameters are less variable from thermal effects.

A low beta transistor usually has slightly higher interjunction capacitances than transistors which meet the manufacturer's intended design. Consequently, these transistors will oscillate quite well and reliably in the frequency range of broadcast radio, viz., 550 kHz. to 1650 kHz. But in the higher frequency spectrum, i.e. from 3 to 10 megahertz they simply cease to have sufficient gain to overcome the interjunction capacitances which act as radio frequency shorts. They will oscillate in the broadcast band, but will not oscillate very much above this range.

On the other hand, a so-called good transistor with very high betas and relatively low interjunction capacitances will easily oscillate up to 3, 5, 10 and even 20 megahertz. Even the better computer type transistors will work well above the frequency at which the metal detector is to function.

Now referring back to the oscillator X schematic of FIGURE 1, it is seen that there are actually two oscillatory circuits in the design. One of these, the simple tuned circuit consisting of $L_f$ and $C_f$, is the tuned circuit which we want to control the frequency of oscillation.

However, there is a second oscillatory circuit consisting of $L_p$, the series base coupling capacitor $C_B$, and the interjunction capacitance of the transistor Q between collector and base. Because $L_p$ has fewer turns of the same diameter as the search coil $L_f$ and also because the total effective capacity between collector *c* and base *b* is very much less than $C_f$, the resonant frequency of this second oscillatory circuit will be quite a lot (several times) that of the desired tuned circuit.

Whichever of these two possible oscillatory circuits can furnish the transistor Q with the greatest amount of regeneration will govern the frequency of oscillation at which the oscillator circuit will operate. Recalling that the tuned circuit of $C_fL_f$ is but loosely coupled back to $L_p$, it is possible that even though Q is higher, it may not couple back into the transistor circuit as much regenerative power as will the coil, $L_p$, which is obviously directly coupled between the collector and base of the transistor. In this case, the frequency of oscillation will be controlled by the circuit containing $L_p$ as the inductance and the frequency will be much too high to fall in the broadcast band.

Whichever of the oscillatory circuits is providing the fundamental frequency of oscillation, the other is seen by it as only a slight, non-resonant load.

The above condition under which the fundamental frequency can be determined by the circuitry containing $L_p$ in resonance can occur only when the transistor of the circuit is a conventional good transistor with high beta and low interjunction capacitances (generally an expensive transistor). This condition will not occur when the transistor is a poor transistor with low beta and low gain; such a transistor will not sustain oscillation at these much higher frequencies.

$L_s$ is in the circuit to act as a radio frequency choke, that is, to provide more suppression and damping for higher impressed frequencies. It acts to damp all radio frequencies somewhat, whether at the fundamental frequency of $L_fC_f$ or the frequency if determined by $L_p$. However, the effect of $L_s$ is very much greater in suppressing the higher frequency which would be present if $L_p$ were to govern the fundamental frequency. Thus, the function of $L_s$ is to prevent the circuit from oscillating at a high fundamental as it would if the circuit were otherwise to operate at a high frequency determined by the $L_p$ circuit. Therefore, the circuit will always oscillate at the desired fundamental frequency dictated by $L_f$ and $C_f$.

Note that the presence of $L_s$ even though it has some effect upon the desired frequency does not prevent oscillation at the desired frequency for the fact that regeneration control, $R_4$, is in the circuit. Any tendency of $L_s$ to quench oscillation at the desired frequency is simply overcome by turning $R_4$ slightly clockwise to increase circuit regeneration enough that oscillation is again sustained.

In summary, $L_s$ is needed in the circuit only if the transistor is a high gain, good quality transistor. $L_s$ would not be needed in the circuit at all if the transistor were a low beta, low quality transistor.

While in the foregoing there has been described and shown the preferred embodiment of this invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed is:

1. A metal body locator comprising a first functionally variable frequency oscillator, adjusted to normally produce a first high frequency output signal, a second functionally variable frequency oscillator adjusted to normally produce a second high frequency output signal which is separated in frequency from said first high frequency output signal, a first inductive search means coupled with said first oscillator for varying the operating frequency of said first oscillator when a metal body enters the inductive field of said first search means, a second inductive search means coupled with said second oscillator for varying the operating frequency of said secon doscillator when a metal body is present within the inductive field of said second search means, means for cross-coupling said first and second variable frequency oscillators with a controlled coupling effect to cause each oscillator normally to pull the other oscillator frequency toward an intermediate frequency, without causing the other oscillator frequency to quite reach said intermediate frequency, detector means responsive to said output signals of said oscillators for producing an audible beat frequency signal, said first and second oscillators being of substantially equal power, said first and second search means each comprising an inductive search coil connected in a tuned resonant circuit, the search coils of said first and second search means being wound to have substantially different diameters.

2. The metal body locator as set forth in claim 1 wherein said tuned resonant circuits are isolated floating tank circuits inductively coupled to their respective oscillators.

3. The metal body locator as set forth in claim 1 wherein the search coils of said first and second search means are physically separated in space in mutually perpendicular planes so that when one of said search coils is positioned to sense a metal body and is thus active, the other search coil is sufficiently removed from said metal body to be insensitive to said metal body and is thus passive, and said first and second oscillators are located approximate their respective search coils.

4. The metal body locator set forth in claim 3 wherein said first and second search coils and their respective oscillators are supported at opposite ends of a portable angular handle bar.

5. The metal body locator set forth in claim 1 wherein the search coils of said first and second search means are mounted concentrically at the same end of a handle bar.

6. The metal body locator set forth in claim 3 wherein said detector means is a radio receiver which is positioned to be equally space coupled to said oscillators.

7. The metal body locator set forth in claim 1 wherein said cross-coupling means includes a cross-coupling circuit comprising first and second cross-coupling inductances inductively coupled to the search coils of said first and second search means respectively, and a cross-coupling tuning capacitor in closed circuit therewith.

8. The metal body locator of claim 7 together with means for selectively making and breaking said cross-coupling circuit.

9. A metal body locator comprising a first oscillator means adapted to produce a first high frequency output signal, a second oscillator means adapted to produce a second high frequency output signal which is normally separated in frequency from said first high frequency output signal, a first inductive search means coupled with said first oscillator means for varying the operating frequency of said first oscillator means when a metal body enters the inductive field of said first search means, a second inductive search means coupled with said second oscillator means for varying the operating frequency of said second oscillator means when a metal body is present within the inductive field of said second oscillator means, detector means responsive to said first and second high frequency signals for producing an audible beat frequency signal, said first and second search means each comprising an inductive search coil connected in a tuned resonant circuit, the search coils of said first and second search means being wound to have substantially different diameters, and being physically separated in space with the axis of the electromagnetic field of the first search coil making an angle of approximately 90 degrees with the axis of the electromagnetic field of said second search coil, thus making one of said search coils active while the other is passive, said search coils further being supported at opposite ends of an angular handle bar, and automatic means for shifting the frequency of one of said oscillators so that the beat frequency shift will always be in the same direction irrespective of which search coil is active and which is passive.

10. The metal locator set forth in claim 9 wherein said automatic means comprises means which varies the inductance of the search coil of said one oscillator and which is gravity actuated to alternately move toward and away from the search coil of said one oscillator in response to shifting of the search coil of said one oscillator from passive to active position and vice versa.

11. The metal locator set forth in claim 10 wherein said automatic means comprises a shorted coil of wire with means for pivotally supporting said shorted coil of wire near the search coil of said one oscillator.

12. The metal locator set forth in claim 10 wherein said automatic means comprises a body of ferritic material with means for pivotally supporting said body of ferritic material near the search coil of said one oscillator.

13. The metal locator set forth in claim 1 wherein said first and second oscillator means include a base biased transistor whose base bias is adjusted for the minimum base current which will support sustained oscillations for the purpose of thermal stability, and a regeneration control potentiometer for controlling the oscillator gain slightly above and below unity.

14. The metal locator set forth in claim 4 wherein said detector means is a radio receiver which is mounted on said handle at a mid-position between said first and second search coils.

15. The metal locator set forth in claim 1 wherein said first and second high frequency output signals are within the approximate range of from 200 kilohertz to 2000 kilohertz.

16. The metal body locator set forth in claim 4 wherein said cross-coupling means includes a cross-coupling circuit comprising first and second cross-coupling inductances inductively coupled to the search coils of said first and second search means respectively and a cross-coupling tuning capacitor in closed circuit with said first and second cross-coupling inductances.

17. The metal body locator set forth in claim 16 wherein said handle bar includes a handle means at the mid length of said handle bar facilitating the portability of said metal locator with one search coil located above and parallel to the ground, and whereby the handle bar may be readily rotated 180 degrees to bring the other search coil above and parallel to the ground.

18. The metal body locator set forth in claim 17 wherein said cross-coupling tuning capacitor is mounted approximate said handle means with ready access to an operator holding said handle means for tuning adjustment.

References Cited

UNITED STATES PATENTS

| | | | |
|---|---|---|---|
| 2,012,479 | 8/1935 | Planta | 324—3 XR |
| 2,271,951 | 2/1942 | Pearson et al. | 324—5 |
| 2,321,356 | 6/1943 | Berman | 324—3 XR |
| 2,398,800 | 4/1946 | Millington | 324—5 |
| 2,408,029 | 9/1946 | Bazzoni et al. | 324—5 |
| 2,442,805 | 6/1948 | Gilson | 324—3 XR |
| 2,447,316 | 8/1948 | Curtis | 324—3 XR |
| 2,451,596 | 10/1948 | Wheeler | 324—3 |
| 3,259,837 | 7/1966 | Oshry | 324—6 |
| 3,327,203 | 6/1967 | Attali | 324—6 |
| 3,355,658 | 11/1967 | Gardiner | 324—3 |

OTHER REFERENCES

Turner, Rufus P.: A Modern Metal Locator, Radio and Television News, pp. 35–37 and 119–120, September 1954.

Bohr, Edwin: Two Transistorized Metal Locators, Radio Electronics, pp. 54–57, March 1955.

Parker, Harry D.: Transitone Locates Hidden Wiring, Radio Electronics, p. 35, December 1960.

GERARD R. STRECKER, Primary Examiner

U.S. Cl. X.R.

324—41, 67